United States Patent
Cook

(10) Patent No.: US 11,792,763 B2
(45) Date of Patent: Oct. 17, 2023

(54) WIRELESS STATION LOCATION DETECTION AND MANAGEMENT

(71) Applicant: Charter Communications Operating, LLC, St. Louis, MO (US)

(72) Inventor: Charles I. Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 302 days.

(21) Appl. No.: 17/026,559

(22) Filed: Sep. 21, 2020

(65) Prior Publication Data

US 2022/0095264 A1    Mar. 24, 2022

(51) Int. Cl.
| | |
|---|---|
| H04W 64/00 | (2009.01) |
| H04B 7/185 | (2006.01) |
| H04W 72/04 | (2023.01) |
| H04W 72/51 | (2023.01) |

(52) U.S. Cl.
CPC ...... *H04W 64/003* (2013.01); *H04B 7/18513* (2013.01); *H04W 72/51* (2023.01)

(58) Field of Classification Search
CPC .............. H04W 64/003; H04W 72/048; H04B 7/18513
See application file for complete search history.

(56) References Cited

U.S. PATENT DOCUMENTS

| | | | | |
|---|---|---|---|---|
| 2013/0207840 A1* | 8/2013 | Mook | .................... | G01S 19/24 |
| | | | | 342/357.63 |
| 2016/0363659 A1* | 12/2016 | Mindell | .................. | G01S 13/66 |
| 2017/0243457 A1* | 8/2017 | Milbrand | ........... | G08B 21/0269 |
| 2019/0041531 A1* | 2/2019 | Schmotzer | ........... | G08G 1/0969 |
| 2021/0103059 A1* | 4/2021 | Shinohara | ............... | G01S 19/14 |
| 2023/0038212 A1* | 2/2023 | Chaudhary | ......... | H04W 64/006 |

FOREIGN PATENT DOCUMENTS

| | | | | |
|---|---|---|---|---|
| EP | 1739881 A1 * | 1/2007 | ............ | H04W 64/00 |
| KR | 20080060502 A * | 7/2008 | | |
| WO | WO-2015167348 A1 * | 11/2015 | ........... | H04B 17/318 |
| WO | WO-2019035113 A1 * | 2/2019 | | |

\* cited by examiner

*Primary Examiner* — Muthuswamy G Manoharan
(74) *Attorney, Agent, or Firm* — Armis IP Law, LLC

(57) ABSTRACT

A wireless base station (such as disposed in a building) synchronizes itself with each of multiple reference stations in a network environment that transmit wireless signals. The wireless base station receives the wireless signals from the multiple reference stations. Based on timing of the received wireless signals, the wireless base station determines its location in a building with respect to the multiple reference stations. The determined location is then used as a basis to notify an allocation management resource of a location of the wireless base station for allocation of one or more wireless channels.

38 Claims, 11 Drawing Sheets

WIRELESS STATION LOCATION DETECTION AND MANAGEMENT

BACKGROUND

It is often desirable to determine a location of a wireless station operating in a wireless network environment. Thus, wireless stations often include GPS (Global Positioning System) capability enabling a respective wireless station to determine its location, whether fixed or changing over time because the wireless station is mobile.

Another way to determine a location of a wireless station is to access configuration information manually generated by a Certified Professional Installer (CPI) that installs the wireless station at a fixed location. According to conventional techniques, manual generation and storage of location information in a wireless station is particularly useful in circumstances in which the wireless station resides indoors because GPS technology relies on use of satellites to determine a location of a wireless station.

BRIEF DESCRIPTION OF EMBODIMENTS

This disclosure includes the observation that determination of a location of a wireless base station in a wireless network environment and allocation of wireless channels to wireless base station suffer from deficiencies. For example, GPS technology is not always reliable to accurately determine a location of a wireless base station, especially when the wireless base station is located in a building and the GPS signals are unable to pass through the building at a sufficiently high power level for the wireless base station to detect them. Additionally, manual generation and storage of location information by a technician for a respective wireless base station is tedious and time consuming. In certain instances, a wireless base station may move from one location to another in a building or may be moved to a location outside of the building. In such an instance, manual generation of location information is again undesirable.

In contrast to conventional techniques, embodiments herein include providing improved location determination of a wireless base station and allocation of wireless channels in a wireless network environment.

Embodiments herein include a first transponder of multiple transponders in a network environment. The first transponder receives a first wireless satellite signal; the first wireless signal is received at a first wireless carrier frequency. The first wireless satellite signal supports location determination. The first transponder converts the first wireless satellite signal into a first wireless transponder signal. The first transponder transmits the first wireless transponder signal at a second carrier frequency. Via the first wireless transponder signal and additional wireless transponder signals from multiple transponders (such as a second transponder, third transponder, etc.), a wireless station determines its location in a network environment.

In accordance with further example embodiments, the wireless station is disposed in a building that blocks the wireless station from receiving the first wireless satellite signal. In one embodiment, the wireless station is unable to receive the first wireless satellite signal transmitted at the first wireless carrier frequency because the first wireless satellite signal does not pass through the building at sufficiently high power. The transponder can be configured to include a first mixer. The first mixer multiplies (modulates) the first wireless satellite signal by the second carrier frequency to produce the first wireless transponder signal. In one embodiment, the first wireless transponder signal is one of multiple sideband signals produced by the first mixer. One of the sidebands is selected and communicated to the wireless base station.

As previously discussed, a network environment can be configured to include multiple transponders such as the first transponder and a second transponder. The second transponder receives a second wireless satellite signal. The second wireless satellite signal is received at a third wireless carrier frequency and supports location determination. The second transponder converts the second wireless satellite signal into a second wireless transponder signal communicated at a fourth carrier frequency in the network environment. The second wireless transponder signal supports location determination by the wireless base station.

In still further example embodiments, conversion of the second wireless satellite signal into the second transponder signal includes: via a second mixer, multiplying the second wireless satellite signal by the fourth carrier frequency to produce the second wireless transponder signal.

In one embodiment, the first wireless satellite signal is transmitted from a first GPS (Global Positing System) satellite; and the second wireless satellite signal is transmitted from a second GPS satellite.

In still further example embodiments, the first transponder receives a second wireless satellite signal; the second wireless signal is received at a particular wireless carrier frequency and supports the location determination. The first transponder converts the second wireless satellite signal into a second wireless transponder signal and transmits the second wireless transponder signal in the network environment. The second transponder wireless signal is transmitted at a different carrier frequency than the particular carrier frequency and supports the location determination by the wireless station.

In accordance with further example embodiments, note that each of the transponders is configured to transmit respective location signals using the same carrier frequency, but each transponder transmitted wireless signal (location signal) is coordinated in time so as not to interfere with the other transponders using time division multiplexing (a.k.a., TDM) techniques. In one embodiment, this is achieved via synchronizing each transponder with a common GPS timing signal and then delaying transmission times with respect to each other. For example, a first transponder 1 transmits at time T1, a second transponder 2 transmits at time T1+a, a third transponder 3 transmits at time T1+a+b, etc. In such an instance, only a single or fewer carrier frequencies are needed. Note that other modulation techniques are also possible such as spread spectrum. This could be beneficial in RF noisy areas.

Further embodiments herein include, via the wireless station: receiving the first wireless transponder signal; deriving the first wireless satellite signal from the first wireless transponder signal; and utilizing the first wireless satellite signal derived from the first wireless transponder signal to determine a location of the wireless station in the network environment. The wireless station communicates the determined location of the wireless station to a communication management resource that allocates use of wireless bandwidth to the wireless station based on the determined location.

In still further example embodiments, the first transponder wirelessly transmits a message in the network environment; the message indicates a location of the first transponder.

In accordance with further example embodiments, a wireless base station synchronizes itself with each of multiple reference stations in a network environment. The wireless base station of unknown location receives wireless signals from the multiple reference stations. Based on timing of the received wireless signals, the wireless base station determines its current location in the building with respect to the multiple reference stations.

In one embodiment, each of the reference stations determines its own location such as via reception of wireless signals transmitted from multiple different satellites. The reference stations communicate location information indicating their location to the wireless base station. Thus, the wireless base station receives location information indicating locations of the multiple reference stations. The wireless base station determines its location (in the building) based on the timing of the received wireless signals and the locations of the multiple reference stations.

In accordance with further example embodiments, the multiple reference stations include a first wireless station, a second wireless station, and a third wireless station. The wireless base station receives a first wireless signal from the first reference station disposed at a first location of the building; the wireless base station receives a second wireless signal from the second reference station disposed at a second location of the building; the wireless base station receives a third wireless signal from the third reference station disposed at a third location of the building. In one embodiment, based on the timing of receiving the wireless signals and locations of the reference stations, the wireless base station determines its own location.

In accordance with further example embodiments, the wireless base station determines a respective time delay of communications from each of the multiple reference stations and the wireless base station; the wireless base station determines the location of the wireless base station based at least in part on the respective time delays (e.g., time of flight information).

In one embodiment, the reference stations are located on the building at a specific one or more heights. Further embodiments herein include, via the received wireless signals, determining a height of the wireless base station in the building with respect to the multiple reference stations.

In still further example embodiments, the wireless base station is a first wireless base station of multiple wireless base stations in the building. Subsequent to the first wireless base station determining its location, the first wireless base station transmits a wireless location signal from the first wireless base station to any other listening wireless base stations. In one embodiment, the wireless location signal supports determination of a respective location of a second wireless base station in the network environment.

In yet further example embodiments, the building is a first building in the network environment. The network environment includes a second building. In one embodiment, the multiple reference stations include at least a first reference station and a second reference station. The first reference station is installed in the first building; the second reference station installed in the second building of the network environment. In such an instance, the wireless base station determines its location based on reference stations in one or more different buildings.

Note that any of the resources as discussed herein can include one or more computerized devices, communication management resources, mobile communication devices, servers, base stations, wireless communication equipment, communication management systems, controllers, workstations, user equipment, handheld or laptop computers, cloud computing, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location determination in a network environment. The instructions, when executed by computer processor hardware, cause the computer processor hardware (such as one or more co-located or disparately processor devices or hardware) to: synchronize the wireless base station with each of multiple reference stations in a network environment; receive wireless signals from the multiple reference stations; and based on timing of the received wireless signals, determine a location of the wireless base station in the building with respect to the multiple reference stations.

Another embodiment herein includes a computer readable storage medium and/or system having instructions stored thereon to facilitate location determination in a network environment. The instructions, when executed by computer processor hardware, cause the computer processor hardware (such as one or more co-located or disparately processor devices or hardware) to: receive a first wireless satellite signal, the first wireless signal received at a first wireless carrier frequency and supporting location determination; convert the first wireless satellite signal into a first wireless transponder signal; and transmit the first wireless transponder signal in a network environment including a wireless station, the first transponder wireless signal transmitted at a second carrier frequency and supporting location determination by the wireless station.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
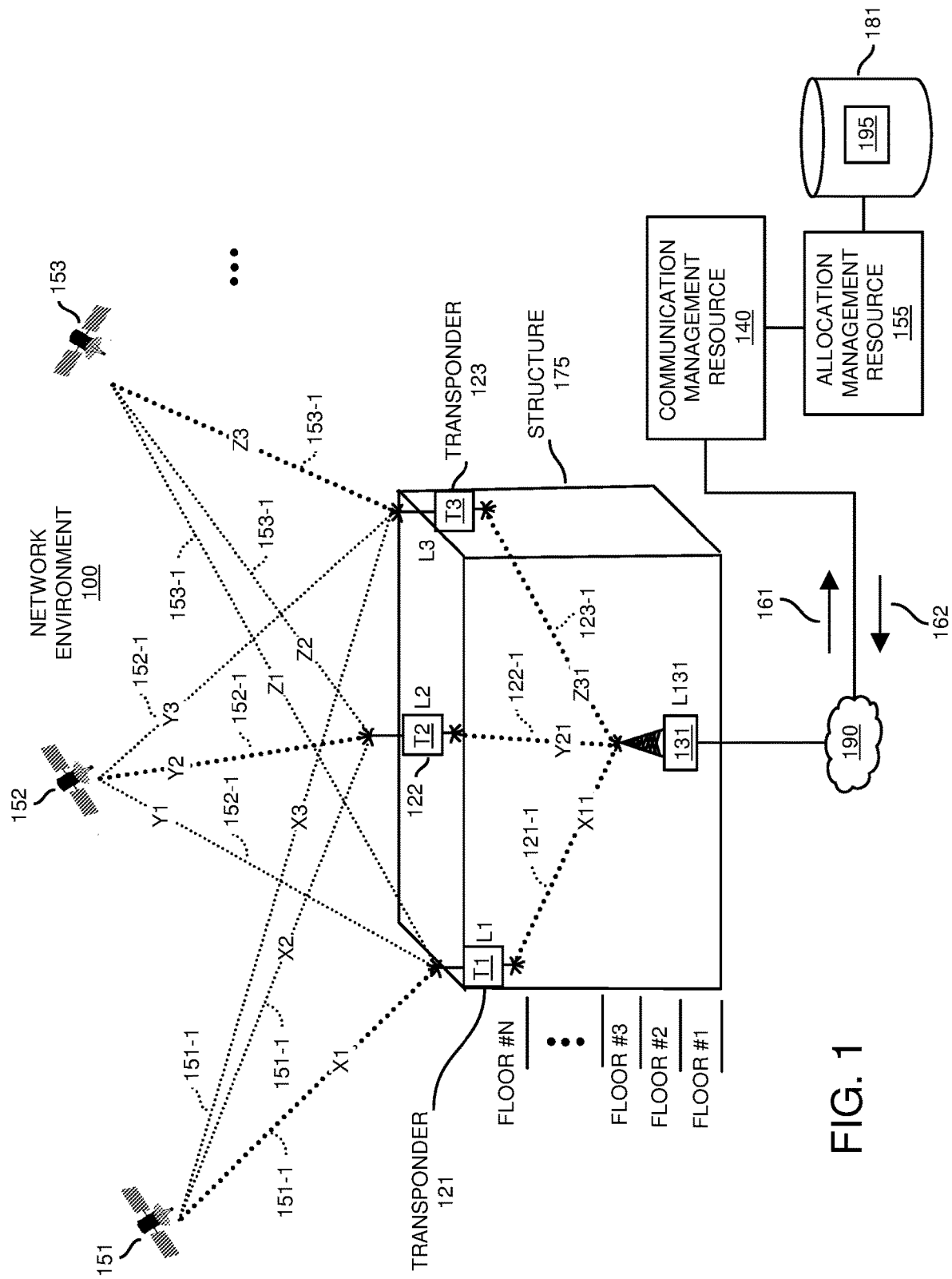
FIG. 1 is an example diagram illustrating a wireless network environment and implementation of location determination techniques according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Certain wireless communication devices are only allowed to operate in certain locations. One example is an indoor CBRS radio device (such as a femtocell or wireless base station). In the case of an indoor CBRS radio device, the spectrum it occupies is shared. The sharing of the spectrum (such as the wireless CBRS band) is managed by a Spectrum Access System (SAS). The SAS determines what spectrum the CBRS radio can transmit on based on knowledge of where the radio is located, and what other devices are nearby that are also sharing the spectrum. When outdoors, GPS signals can be used. However, reception of GPS signals requires line-of-sight from the GPS satellite to the terrestrial GPS receiver in the wireless base station. Thus, wireless base stations disposed in a structure such as a building do not have the ability to determine their location based on GPS signals received from satellites.

Embodiments herein include a system that determines location of a respective communication device when line-of-sight to a GPS satellite is not available to that device such as due to signals being blocked. The system also detects whether the device has been relocated from an original location to new location.

In addition to working with a SAS to ensure the communication device does not cause interference, it can also be used to "geo-fence" the device to inactivate it. For example, in one embodiment, the wireless service provided through a provisioning system communicates a location value to the communication device. This location value indicates the location where the service provider expects the communication device (such as wireless base station) to reside and be used to provide wireless service by a respective subscriber to which the wireless base station is provisioned. The communication device compares this location data (location value) provisioned in it by the service provider or some other entity with the calculated location as determined by the wireless base station from the location transponders, wireless reference stations, etc. In accordance with further example embodiments, the service provider can be configured to provision the communication device with a deviation parameter that indicates how far from the provisioned location the communication device (wireless base station determining its location) can deviate from before the device ceases to operate (such as wirelessly transmit signals). This is sometimes referred to as "geo-fencing". It is used to ensure that the communication device is only used within an authorized area and/or to discourage removal of the device from a specific area.

In the case of CBRS or any system requiring the use of a SAS, embodiments herein also provide a mechanism to enable the SAS to track the device throughout a building or a geographic area so that the device can be moved or even in motion. The SAS controls allocation of one or more wireless channels to the device to prevent wireless interference with other communication devices.

Conventional approaches of determining the location of a respective wireless communication device have included professional installations using a GPS receiver at the periphery of the building/location where a GPS signal is available, and then manually measuring from that point to where the newly installed device is mounted. Typically the device is mounted permanently to ensure that an unauthorized individual does not move the device to a location where it causes interference.

Timing and Synchronization Beacons

The LTE (Long Term Evolution) wireless communication protocol has a Network Listening capability for synchronizing femtocells (small cell wireless base stations) with macrocells (large cell wireless base stations).

A femtocell wireless base station can be configured to determine its location and synchronize itself to a network by communicating with a Macrocell wireless base station. The macrocell wireless base station can be equipped with an application that performs PTP (Precision Timing Protocol). The application retrieves timing from GPS signals. Location information can also be retrieved.

In one embodiment, the femtocell base station communicates with the macrocell and connects to the application. The femtocell requests synchronization. The application then initiates the PTP protocol. The PTP protocol synchronizes the femtocell and also determines the propagation delay from the macrocell to the femtocell. In one embodiment, the application also provides a time window for the femtocell to check back in for a time update. The time window may be based on the holdover time that the femtocell clock is able to maintain. In one embodiment, the holdover time of the femtocell is communicated from the femtocell to the macrocell. The reason for the time window is to spread out the requests to even out the load on the macrocell to support timing.

The PTP algorithm as previously discussed can be configured to also allow the femtocell to know what the propagation delay is between the macrocell and the femtocell. The macrocell can provide its location coordinates, or the femtocell can retrieve the location of the macrocell from a database. The femto cell now attempts to communicate with a second or possibly a third, fourth, etc., macrocell and requests a PTP algorithm be run. With location coordinates from 2 or more macrocells, and time of flight delay time of wireless communications, the femtocell can calculate its own location. This location information of the wireless base station is communicated to the SAS. This location information can also be used to track the femtocell, or even geo-fence the femtocell.

In accordance with further example embodiments, after the femtocell is synchronized, it can behave as the macrocell in assisting other devices in determining their location and becoming synchronized.

A synchronized femtocell, or a functionally reduced femtocell can be configured to act as an active timing and location beacon. If in the CBRS band, it needs a way to contact a SAS. It can do so by first acting as a UE and calling a serving application. It reports its location from the GPS information it receives. In this way, the timing and location beacon does not need a permanent connection to the network.

Alternatively, if it does have a permanent connection to the network, it can use the same techniques as the femtocells to triangulate its location if it does not have GPS or is in a location where a GPS signal is not available.

This capability does not need to be a particular band. It could be in the CBRS band with CBRS service and compliant with SAS. It could also be in unlicensed bands. If implemented in lower frequency bands, coverage will be better provided that the femtocells also have radios in the same lower bands.

Now, more specifically, with reference to the drawings, FIG. 1 is an example diagram illustrating a communication network environment and respective wireless connectivity according to embodiments herein.

As shown, network environment 100 includes multiple transponders including transponder 121, transponder 122, transponder 123, etc. Each of the transponders reside at a fixed location of a respective structure 175 such as a one or more buildings or other suitable entity.

For example, in this embodiment, the transponder 121 resides at location L1; the transponder 122 resides at location L2; the transponder 123 resides at location L3; and so on.

The network environment 100 further includes any number of satellites such as satellite 151, satellite 152, satellite 153, etc. Each of the satellites communicates a respective wireless location signal in the network environment 100.

For example, the satellite 151 broadcasts wireless communication signal 151-1 in the network environment 100. Each of the transponders 121 (a.k.a., T1), 122 (a.k.a., T2), 123 (a.k.a., T3), etc., receives the wireless signal 151-1.

The satellite 152 broadcasts wireless communication signal 152-1 in the network environment 100. Each of the transponders 121, 122, 123, etc., receives the wireless signal 152-1.

The satellite 153 broadcasts wireless communication signal 153-1 in the network environment 100. Each of the transponders 121, 122, 123, etc., receives the wireless signal 153-1.

In one embodiment, each of the satellites in network environment 100 communicates the respective wireless signals in accordance with GPS (Global Positioning System) technology. In one embodiment, the transponders determine their location based on timing of receiving each of the wireless signals such as using GPS techniques.

For example, the transponder 121 receives: i) wireless signal 151-1 transmitted from the satellite 151, ii) wireless signal 152-1 transmitted from the satellite 152, and iii) wireless signal 153-1 transmitted from the satellite 153.

In one embodiment, if desired, each of the transponders determines their location by computing, for each received satellite signal, the difference between the time that a respective wireless signal is transmitted from a respective satellite and the time the respective wireless signal is received by the transponder. The satellites can be configured to implement atomic clocks that provide extremely accurate time.

In one embodiment, to determine location, the transponder determines the time difference between the time of signal reception by the transponder and the broadcast time from the satellite (as indicated by information in the received wireless signal) to compute the distance of the respective transponder to the satellite. Based on time of flight information associated with receiving each of 3 or more wireless satellite signals, each of the transponders determines its location. If desired, each of the transponders communicates their determined location coordinates to the wireless base station 131 in furtherance of the wireless base station 131 calculating its location as further discussed herein.

In one embodiment, as its name suggests, time of flight represents a time it takes for a respective signal to travel from the satellite to the corresponding transponder. For example, wireless signal 151-1 has a time of flight X1 between satellite 151 and transponder 121; wireless signal 152-1 has a time of flight Y1 between satellite 152 and transponder 121; wireless signal 153-1 has a time of flight Z1 between satellite 153 and transponder 121.

Wireless signal 151-1 has a time of flight X2 between satellite 151 and transponder 122; wireless signal 152-1 has a time of flight Y2 between satellite 152 and transponder 122; wireless signal 153-1 has a time of flight Z2 between satellite 153 and transponder 122.

Wireless signal 151-1 has a time of flight X3 between satellite 151 and transponder 123; wireless signal 152-1 has a time of flight Y3 between satellite 152 and transponder 123; wireless signal 153-1 has a time of flight Z3 between satellite 153 and transponder 123.

Because each of the wireless signals from respective satellites travel at a known speed (such as 186,000 miles per second), the times of flight indicate a respective distance (such as time of flight time speed) between the corresponding satellite and the receiving transponder.

The transponder 121 therefore receives the wireless signal 151-1, wireless signal 152-1, wireless signal 153-1. Based on a times of flight (such as X1, Y1, Z1) of these wireless signals and determination of corresponding distances, and a known location of the satellites, the transponder 121 determines its location as being L1.

The transponder 122 therefore receives the wireless signal 151-1, wireless signal 152-1, wireless signal 153-1. Based on a times of flight (such as X2, Y2, Z2) of the wireless signals and determination of corresponding distances, and a known location of the satellites, the transponder 122 determines its location as being L2.

The transponder 123 therefore receives the wireless signal 151-1, wireless signal 152-1, wireless signal 153-1. Based on a times of flight (such as X3, Y3, Z3) of the wireless signals, and a known location of the satellites, the transponder 123 determines its location as being L3.

Thus, in one embodiment, each of the transponders determines its respective location (such as latitude, longitude, and altitude) in the structure 175 based upon reception and processing of wireless signals.

Additionally or alternatively, note that a respective installation technician can be configured to program each of the transponders with corresponding location information indicating their respective location in the network environment 100.

In one embodiment, based on the processing of the received wireless signals, each of the transponders determines its location such as latitude, longitude, and altitude in the network environment.

In accordance with further example embodiments, note that each transponder broadcasts one or more wireless signals (such as beacons) in vicinity of the structure 175 (such as one or more buildings) to any of one or more wireless stations in the structure 175 that would like to determine their respective location.

Figure 2:
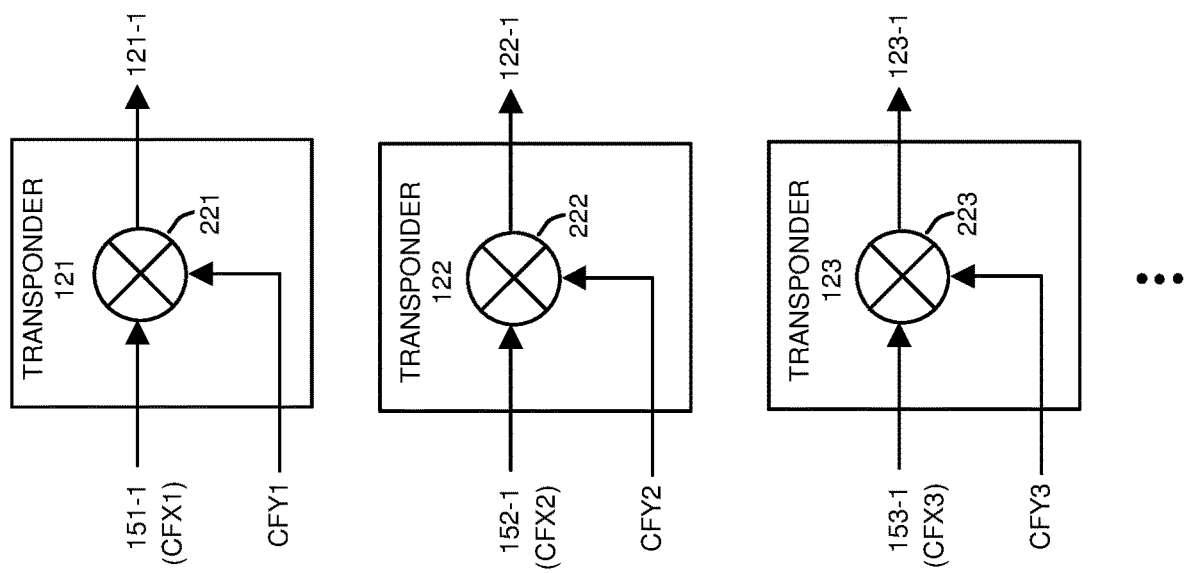
FIG. 2 is an example diagram illustrating implementation of one or more repeaters (transponders) in a network environment according to embodiments herein.

For example, in one embodiment as shown in FIG. 2, the transponder 121 generates wireless signals 121-1 based on one or more of the received wireless signals 151-1, 152-1, and 153-1; the transponder 122 generates wireless signals 122-1 based on one or more of the received wireless signals 151-1, 152-1, and 153-1; the transponder 123 generates wireless signals 123-1 based on one or more of the received wireless signals 151-1, 152-1, and 153-1.

As a further more specific example, in one embodiment, the transponder 121 generates wireless signal 121-1 from the wireless signal 151-1 and carrier frequency CFY1; the transponder 122 generates wireless signal 122-1 from the wireless signal 152-1 and carrier frequency CFY2; the transponder 123 generates wireless signal 123-1 from the wireless signal 153-1 and carrier frequency CFY3.

Carrier frequencies CFY1, CFY2, CFY3, etc., are the same or different carrier frequencies. For example, when each of the transponders uses a same carrier frequency such as CFZ for modulating, the transponders transmit wireless signals 121-1, 122-1, 123-1, etc., at different times to avoid interference amongst each other.

More specifically, in accordance with further example embodiments, note that each of the transponders can be configured to transmit using the same carrier frequency, but each transponder transmitted signal (location signal) is coordinated in time so as not to interfere with the other transponders using time division multiplexing (TDM) techniques. In one embodiment, this is achieved via synchronizing each transponder with a common GPS timing signal. For example, a first transponder 121 transmits at time T1, a second transponder 122 transmits at time T1+a (where a is a delay time), a third transponder 123 transmits at time T1+a+b (where b is a delay time), etc. In such an instance, only a single or fewer carrier frequencies are needed. Note that other modulation techniques are also possible such as spread spectrum. This could be beneficial in RF noisy areas.

Additionally, in one embodiment, wireless signals 121-1, 122-1, 123-1, etc., transmitted from respective transponders are encrypted via an encryption key. In such an instance, the wireless base station 131 has an appropriate decryption key to decrypt the wireless signals 121-1, 122-1, 123-1, etc.

In accordance with further example embodiments, via the one or more wireless signals 121-1, 122-1, 123-1, etc., the wireless base station 131 determines its current location.

In accordance with further example embodiments, each of the transponders determines its location and forwards such information to the wireless base station 131. In one embodiment, the wireless base station 131 uses the location of the transponders as a basis to determine its own location. Alternatively, the wireless base station 131 determines its location L131 based only on the time of flight information associated with the received wireless signals without accounting for locations of the respective transponders.

Referring again to FIG. 1, after determining its location, note that the wireless base station 131 communicates (such as communications 161 registering and requesting one or more wireless channels) over network 190 to the communication management resource 140 such as a so-called domain proxy that handles communications on behalf of the allocation management resource 155 (such as a spectrum access system). As its name suggests, the allocation management resource 155 keeps track of and controls allocating one or more wireless channels (such as via communications 162) to wireless stations in the network environment 100 such that the two nearby wireless stations are not allocated the same wireless channel. Allocating one or more wireless channels based on knowing a location of each of the requesting one or more wireless stations and spatially separating use of the same wireless channel in the different locations prevents wireless interference amongst the wireless base stations.

FIG. 2 is an example diagram illustrating implementation of one or more transponders (such as repeaters) according to embodiments herein.

In this example embodiment, each of the transponders is configured to re-transmit a selected one of the multiple received wireless communication signals from satellites. Alternatively, each of the transponders re-transits each of the communication signals received from the satellites.

In one embodiment, in a case in which a respective transponder only transmits a single received wireless communication signal of the multiple received wireless communication signals, the transponder selects the wireless signal generated by the nearest satellite with respect to the corresponding transponder.

For example, assume in this example embodiment that satellite 151 is nearest to transponder 121 (time of flight X1 is less than X2, time of flight X1 is less than time of flight X3), satellite 152 is nearest to transponder 122 (time of flight Y2 is less than Y1, time of flight Y2 is less than Y3), satellite 153 is nearest to transponder 123 (time of flight Z3 is less than time of flight Z1, time of flight Z3 is less than time of flight Z2).

In such an instance, using the shortest paths as previously discussed simulates the wireless base station 131 receiving the wireless communication signals 151-1, 152-1, and 153-1 if it were possible. As further discussed herein, the wireless base station 131 instead receives wireless communication signals 121-1, 122-1, and 123-1 to estimate its location L131.

However, as previously discussed, as an alternative to re-broadcasting a single wireless signal, note that each of the transponders can be configured to re-transmit each of the received wireless communication signals if desired. In this latter instance, each of the transponders retransmits each of the wireless communication signals received from each satellite.

In one embodiment as shown in FIG. 2, the transponder 121 receives the wireless communication signal 151-1 at a carrier frequency such as CFX1 (such as around 1.2 to 1.5 GHz). The transponder 122 receives the wireless communication signal 152-1 at a carrier frequency such as CFX2 (such as around 1.2 to 1.5 GHz). The transponder 123 receives the wireless communication signal 153-1 at a first carrier frequency such as CFX3 (such as around 1.2 to 1.5 GHz).

As previously discussed, each of the wireless signals 151-1, 152-1, and 153-1 is a GPS wireless signal that does not transmit at a sufficiently high power level through the structure 175 to the wireless base station 131. Thus, the wireless base station 131 is unable to determine its location based on these wireless communication signals transmitted from the satellites.

Embodiments herein as shown in FIG. 2 include re-transmitting the received wireless signals at a different carrier frequency (such as around 990 MHz or other suitable value) using a modulator (a.k.a., a mixer or multiplier). The transponders transmit the respective wireless signals at sufficient power to travel through a respective building to the wireless base station 131.

In this example embodiment, the transponder 121 includes a modulator 221. Modulator 221 receives the wireless signal 151-1 as a first input as well as a new carrier frequency CFYx (where x=1, 2, 3, 4, . . . ) such as a carrier frequency in the ISM (Industrial, Scientific and Medical) band or another suitable band as a second input. Via the modulator 221, the transponder 121 modulates the received wireless signal 151-1 onto a new carrier frequency CFY1 to produce the wireless signal 121-1, which is then broadcasted from transponder 121 as wireless signal 121-1 through the structure 175 to any listening wireless base stations.

The transponder 122 includes a modulator 222. Modulator 222 receives the wireless signal 152-1 as a first input as well as a new carrier frequency CFY2 as a second input. Via the modulator 222, the transponder 122 modulates the received wireless signal 152-1 onto a new carrier frequency CFY2 to produce the wireless signal 122-1, which is broadcasted from the transponder 122 through the structure 175 to any listening wireless base stations such as wireless base station 131.

The transponder 123 includes a modulator 223. Modulator 223 receives the wireless signal 153-1 as a first input as well as a new carrier frequency CFY3 as a second input. Via the modulator 223, the transponder 123 modulates the received wireless signal 153-1 onto a new carrier frequency CFY3 to produce the wireless signal 123-1, which is broadcasted from the transponder 123 through the structure 175 to any listening wireless base stations such as wireless base station 131.

In one embodiment, note that each of the modulators can be configured to produce two sideband signals. The respective transponder filters out the upper sideband signal and broadcasts only the lower sideband signal (such as signal 121-1, 122-1, 123-1, etc.) through the structure 175 to any listening wireless base stations such as wireless base station 131. Thus, in one embodiment, the wireless transponder signals (such as signal 121-1, signal 122-1, signal 123-1) is one of multiple sideband signals produced by a respective mixer (modulator, multiplier, etc.).

Figure 3:
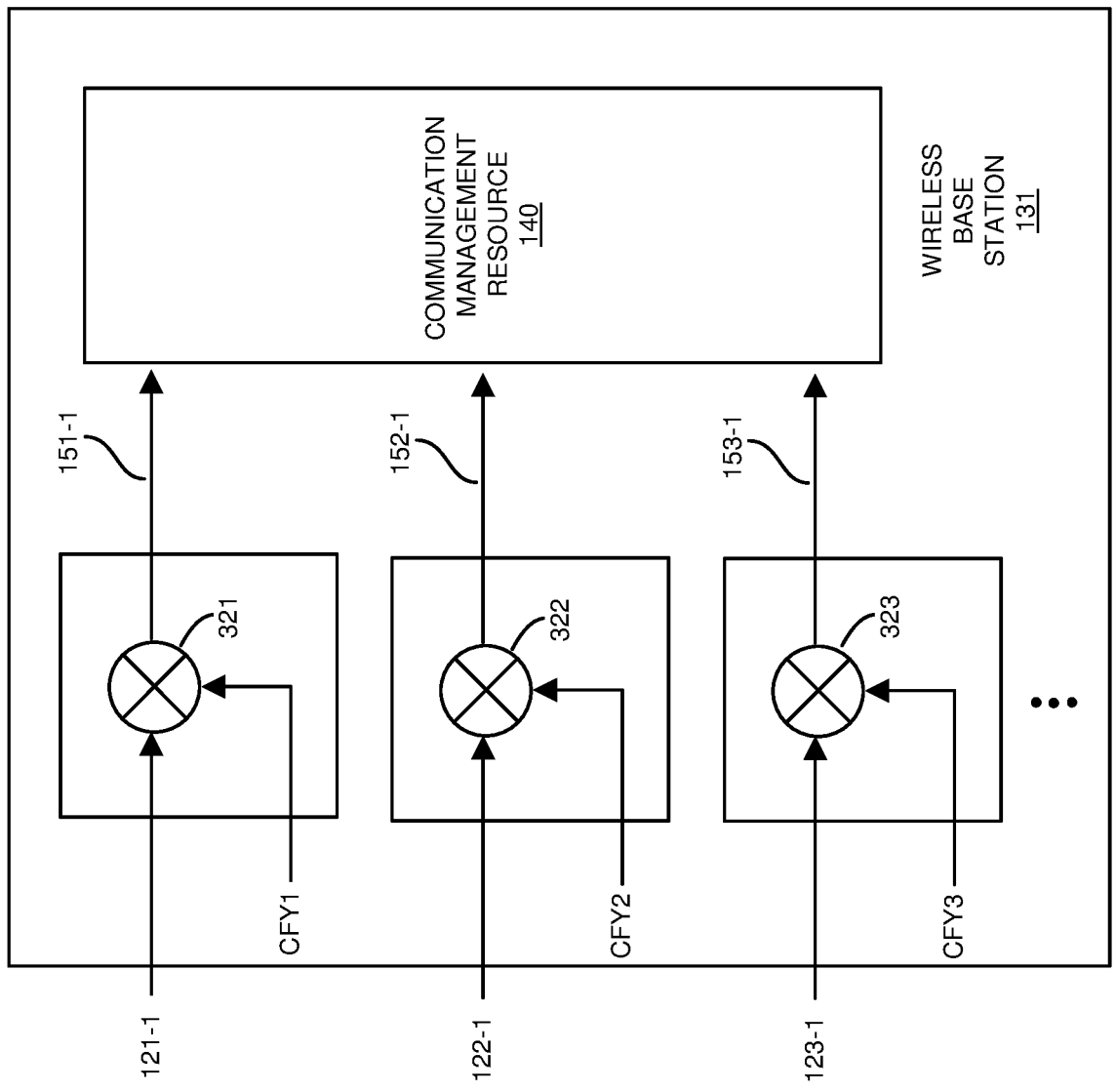
FIG. 3 is an example diagram illustrating signal conversion according to embodiments herein

As further shown in FIG. 3 the wireless base station 131 receives the wireless communication signals 121-1, 122-1, 123-1, etc. Via demodulation of the signals, the wireless base station 131 retrieves the original wireless signals (such as satellite of GPS signals) transmitted by the satellites to determine its respective location.

FIG. 3 is an example diagram illustrating signal conversion according to embodiments herein.

In this example embodiment, the wireless base station 131 includes multiple demodulators 321, 322, 323, etc., to obtain the original wireless communication signals 151-1, 152-1, and 153-1.

For example, demodulator 321 receives input of wireless communication signal 121-1 and carrier frequency CFY1. Via demodulator 321, the wireless base station 131 removes the carrier frequency CFY1 from the received wireless communication signal 121-1 to produce the original wireless communication signal 151-1.

In one embodiment, the time of flight between the wireless communication signal 151-1 being transmitted by the satellite 151 is X1+X11+DELAYT1, where DELAYT1 represents an amount of delay imparted by the modulator 221 and/or demodulator 321.

The time of flight between the wireless communication signal 152-1 being transmitted by the satellite 152 is Y2+Y21+DELAYT2, where DELAYT2 represents an amount of delay imparted by the modulator 222 and/or demodulator 322.

The time of flight between of the wireless communication signal 153-1 being transmitted by the satellite 153 is Z3+Z31+DELAYT3, where DELAYT3 represents an amount of delay imparted by the modulator 223 and/or demodulator 323.

In one embodiment, the communication management resource 140 of the wireless base station 131 receives the delay values DELAYT1, DELAYT2, DELAYT3, etc., and subtracts these respective delay times to determine the time of flight between satellite 151 and the wireless base station is X1+X11 for satellite 151, time of flight between satellite 152 and the wireless base station is Y2+Y21 for satellite 152, time of flight between satellite 153 and the wireless base station is Z3+Z31 for satellite 153.

In one embodiment, the communication management resource 140 uses these combination time of flight values (X1+X11, Y2+Y21, and Z3+Z31) to estimate or determine the location L131 of the wireless base station 131. For example, the time of flight X1+X11 indicates a first distance D11; the time of flight Y2+Y21 indicates a second distance D21; the time of flight Z3+Z31 indicates a third distance D31; etc.

In one embodiment, the wireless base station 131 use trilateration to determine location L131. For example, the wireless base station 131 determines the location L131 based on the intersection of: i) distance D11 from location L1, ii) distance D21 from location L2, and iii) distance D31 from location L3. The determined location is an estimate of the actual location of the wireless base station 131.

Figure 4:
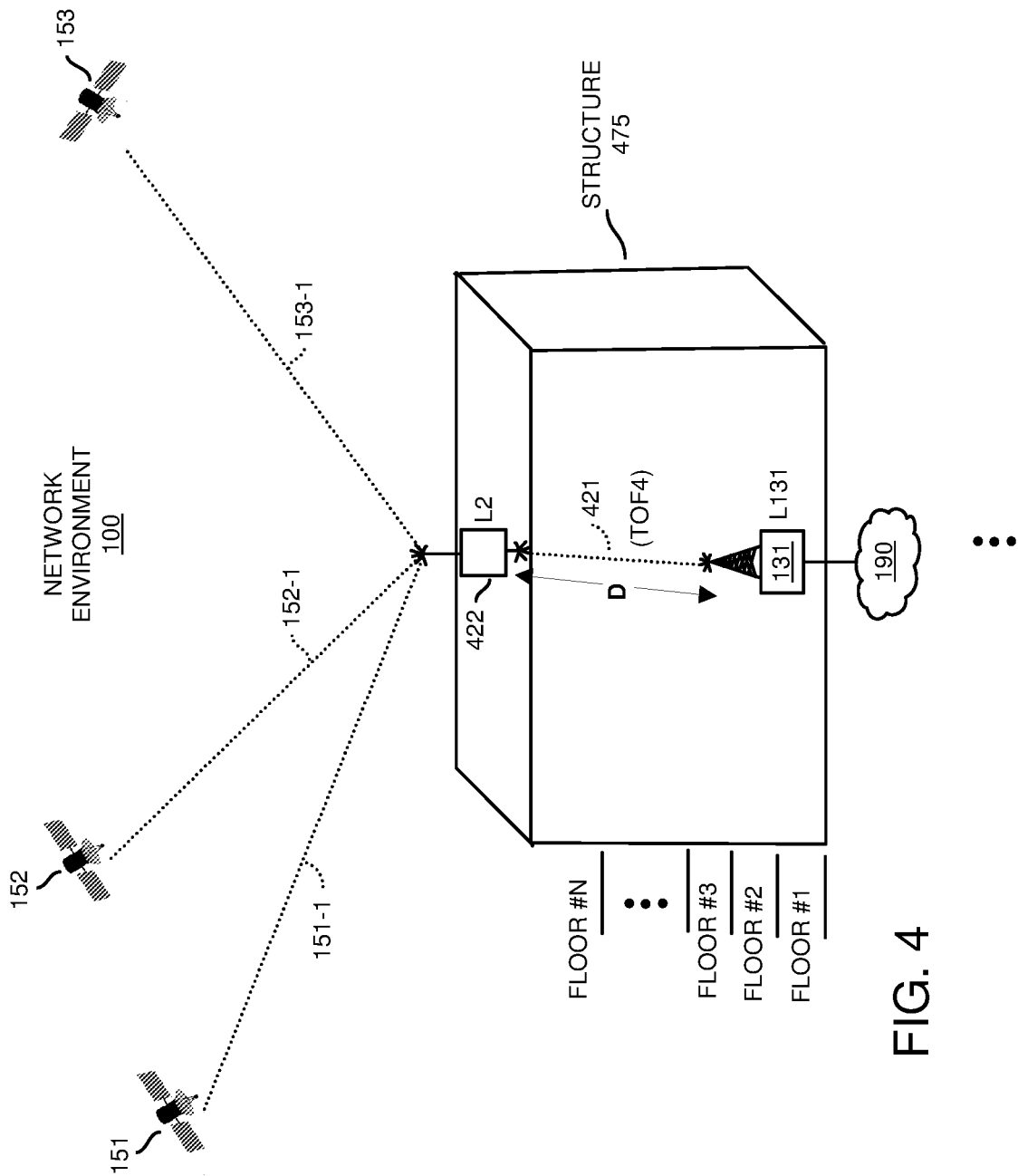
FIG. 4 is an example diagram illustrating location determination using a single reference station according to embodiments herein.

FIG. 4 is an example diagram illustrating location determination using a single reference station according to embodiments herein.

In this case, a certain degree of geo-location can be used. For example, in one embodiment, wireless base station 131 can be provisioned with a distance value specifying a distance. As long as the wireless base station 131 is detected as being within that distance from the wireless reference station or transponder 422, the wireless base station 131 is enabled to support wireless connectivity and uses the determined location to report to the allocation management resource 155 for allocation of one or more wireless channels as described herein. Thus, eligibility of the wireless base station 131 to be allocated wireless channels is contingent upon detecting that the wireless base station 131 resides within a specific location or within a specified threshold value distance of a location of reference station.

In this example embodiment, in a similar manner as previously discussed, the wireless reference station 422 determines its location L2 based on wireless communication signals (such as signals 151-1, 152-1, 153-1, etc.) received from multiple satellites or the location information L2 is manually assigned via an installer.

Alternatively, the location L2 of the wireless reference station 422 is manually determined and applied to the wireless reference station 422.

In one embodiment, the wireless reference station 422 or other suitable entity communicates its location (such as latitude, longitude, and altitude) to the wireless base station 131. Thus, the wireless base station 131 is aware of the location L2 of the wireless reference station 422.

The wireless base station 131 synchronizes its time clock to a clock of the wireless reference station 422 such that the wireless base station 131 is able to determine the time of flight (TOF4) of communications between the reference station 422 and the wireless base station 131.

Via the determined time of flight information (TOF4 such as time for wireless communications to travel from the reference station 422 at location L2 to the wireless base station 131), the wireless base station 131 determines that it resides at a distance D from the reference station 422 at location L2. For example, the wireless signal 421 from the wireless reference station 422 travels at a known speed (distance per time). In one embodiment, the distance D is determined based on multiplying the time of flight value TOF4 by the known speed (such as around 186,000 miles per second) of the wireless signal 421. Note that the speed of the wireless signal through the respective structure may be slower due to passing through solid material.

Based on a combination of the location L2 of the wireless reference station 422 and knowing that the distance between the reference station 422 and the wireless base station 131 is value D beneath or below the reference station 422 (which resides on top of a building or structure 175), the wireless base station 131 estimates its location as being location L131.

In one embodiment, as previously discussed, the wireless base station 131 is assigned distance information D131 (or distance range). Prior to requesting wireless channel allocation from the allocation management resource 155, the wireless base station compares the calculated value D to its assigned distance information D131 to determine its eligibility of being allocated one or more wireless channels.

In one embodiment, if the calculated distance D as determined by the wireless base station 131 falls within a range as specified by the distance info D131, the wireless base station 131 is eligible and able to register with the allocation management resource 155 for allocation of one or more wireless channels. If distance D falls outside the range as specified by the distance information 131, then the wireless base station 131 is not eligible and is prevented from being allocated wireless channels.

Additionally, or alternatively, note that the distance information D131 can be configured to indicate a threshold distance value with respect to the transponder 422 in order to be eligible for allocation of one or more wireless channels by the allocation management resource 155.

Accordingly, embodiments herein include: receiving location information assigned to the wireless base station; comparing the determined location of the wireless base station to the location information assigned to the wireless base station; and based on results of the comparing, controlling assignment of a wireless channel to the wireless base station.

In a manner as previously discussed, the wireless base station 131 provides location information L131 to the allocation management resource 155 when registering and requesting allocation of one or more wireless channels for use in the respective building in which it resides.

Figure 5:
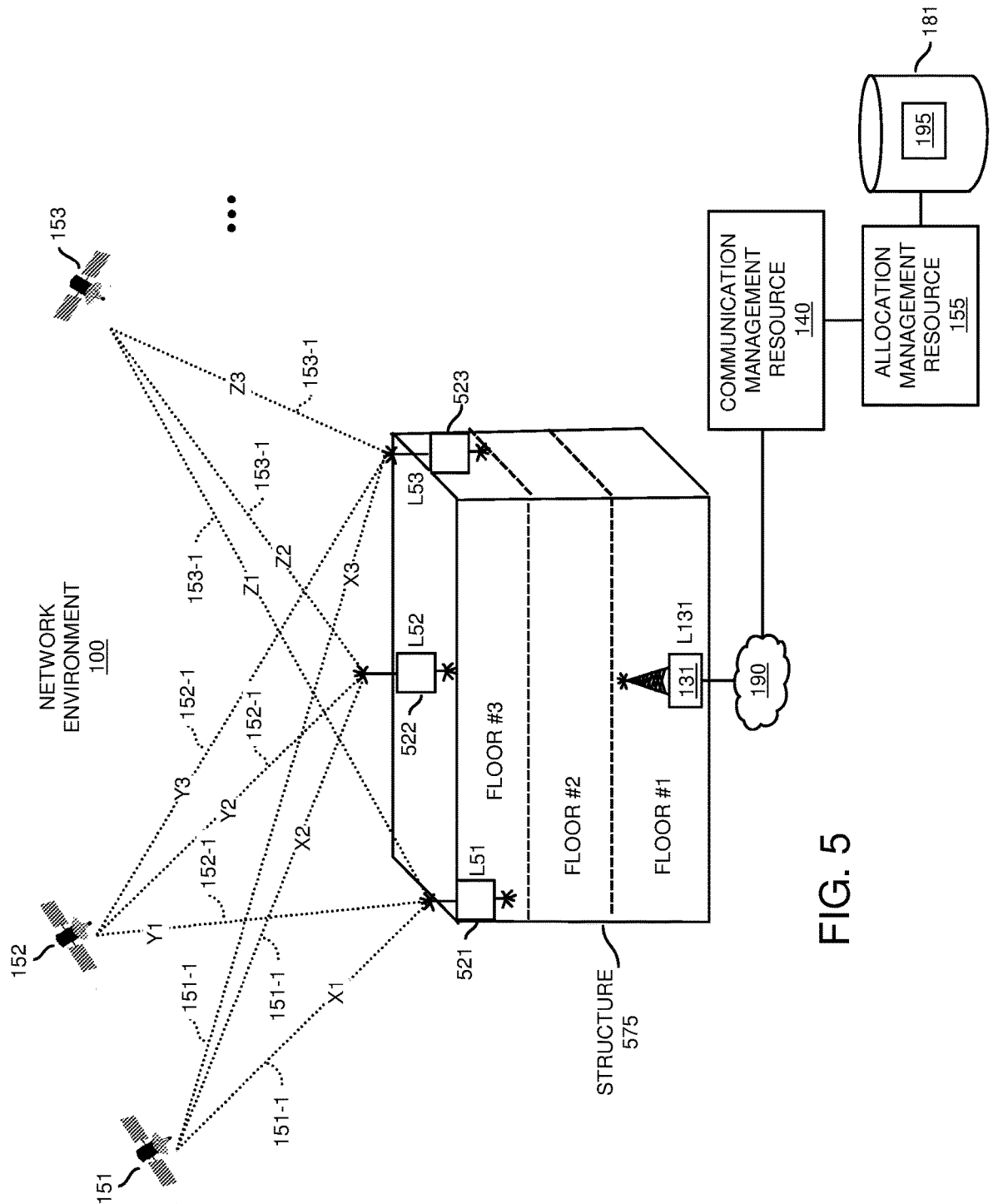
FIG. 5 is an example diagram illustrating multiple reference stations determining their locations according to embodiments herein.

FIG. 5 is an example diagram illustrating multiple reference stations determining their locations according to embodiments herein.

As shown in this example embodiment, network environment 100 includes multiple wireless reference stations such as wireless reference station 521, wireless reference station 522, wireless reference station 523, etc.

In one embodiment, each of the wireless reference stations resides at a fixed location such as on a roof, side, etc., of a respective structure 575 such as a building or other suitable entity.

More specifically, the wireless reference station 521 resides at location L51; the wireless reference station 522 resides at location L52; the wireless reference station 523 resides at location L53, and so on.

The network environment 100 further includes any number of satellites such as satellite 151, satellite 152, satellite 153, etc. Each of the satellites communicates a respective wireless location signal communicating respective timing information in the network environment 100.

For example, the satellite 151 broadcasts wireless communication signal 151-1 in the network environment 100. Each of the wireless reference stations 521, 522, 523, etc., receives the wireless signal 151-1.

The satellite 152 broadcasts wireless communication signal 152-1 in the network environment 100. Each of the wireless reference stations 521, 522, 523, etc., receives the wireless signal 152-1.

The satellite 153 broadcasts wireless communication signal 153-1 in the network environment 100. Each of the wireless reference stations 521, 522, 523, etc., receives the wireless signal 153-1.

In one embodiment, each of the satellites in network environment 100 communicates the respective wireless signals in accordance with GPS (Global Positioning System) technology. In one embodiment, the transponders determine their location based on timing of receiving each of the wireless signals.

For example, the wireless reference station 521 receives: i) wireless signal 151-1 transmitted from the satellite 151, ii) wireless signal 152-1 transmitted from the satellite 152, and iii) wireless signal 153-1 transmitted from the satellite 153.

The wireless reference station 522 receives: i) wireless signal 151-1 transmitted from the satellite 151, ii) wireless signal 152-1 transmitted from the satellite 152, and iii) wireless signal 153-1 transmitted from the satellite 153.

The wireless reference station 523 receives: i) wireless signal 151-1 transmitted from the satellite 151, ii) wireless signal 152-1 transmitted from the satellite 152, and iii) wireless signal 153-1 transmitted from the satellite 153.

In one embodiment, if desired, using GPS techniques, each of the wireless reference stations 521, 522, 523, etc., determines their location by computing the difference between the time that a respective wireless signal is sent from a satellite and the time the respective wireless signal is received by the wireless reference station. The satellites can be configured to implement atomic clocks that provide extremely accurate time.

In one embodiment, to determine location, via trilateration, a respective wireless reference station determines the time difference between the time of signal reception by the wireless reference station and the corresponding broadcast time from the satellite (such as indicated by information in the respective received wireless signal) to compute the distance of the respective wireless reference station to the satellite. Based on time of flight information associated with receiving each of 3 or more received wireless satellite signals, each respective wireless reference station 521, 522, 523, etc., determines its location. In one embodiment, each of the wireless reference stations 521, 522, 523, etc., communicates their determined location coordinates to the wireless base station 131 in furtherance of the wireless base station 131 calculating its own location.

In a similar manner as previously discussed, in one embodiment, the wireless reference stations determine their locations based on time of flight of respective wireless signals. Time of flight represents a time it takes for a respective signal to travel from the satellite to the corresponding wireless reference station.

For example, wireless signal 151-1 has a time of flight X1 between satellite 151 and wireless reference station 521; wireless signal 151-1 has a time of flight X2 between satellite 151 and wireless reference station 522; wireless signal 151-1 has a time of flight X3 between satellite 151 and wireless reference station 523.

Wireless signal 152-1 has a time of flight Y1 between satellite 152 and wireless reference station 521; wireless signal 152-1 has a time of flight Y2 between satellite 152 and wireless reference station 522; wireless signal 152-1 has a time of flight Y3 between satellite 152 and wireless reference station 523.

Wireless signal 153-1 has a time of flight Z1 between satellite 151 and wireless reference station 521; wireless signal 153-1 has a time of flight Z2 between satellite 153 and wireless reference station 522; wireless signal 153-1 has a time of flight Z3 between satellite 153 and wireless reference station 523.

Because the wireless signals travel at a known speed, the times of flight indicate a respective distance between the corresponding satellite and the receiving wireless reference station.

The wireless reference station 521 therefore receives the wireless signal 151-1, wireless signal 152-1, wireless signal 153-1, etc. Based on a time of flight of each of these wireless signals, and a known location of the satellites, the wireless reference station 521 determines its location (such as latitude, longitude, and altitude) as being L51.

The wireless reference station 522 therefore receives the wireless signal 151-1, wireless signal 152-1, wireless signal 153-1, etc. Based on a time of flight of each of these wireless signals, and a known location of the satellites, the wireless reference station 522 determines its location (such as latitude, longitude, and altitude) as being L52.

The wireless reference station 523 therefore receives the wireless signal 151-1, wireless signal 152-1, wireless signal 153-1, etc. Based on a time of flight of each of these wireless signals, and a known location of the satellites, the wireless reference station 523 determines its location (such as latitude, longitude, and altitude) as being L53.

Thus, in one embodiment, each of the wireless reference stations at the structure 575 determines its respective location based upon reception and processing of wireless signals.

Additionally, or alternatively with respect to determining location based on received wireless signals and trilateration, note that a respective installation technician can program each of the wireless reference stations with corresponding location information indicating their respective location in the network environment 100.

Figure 6:
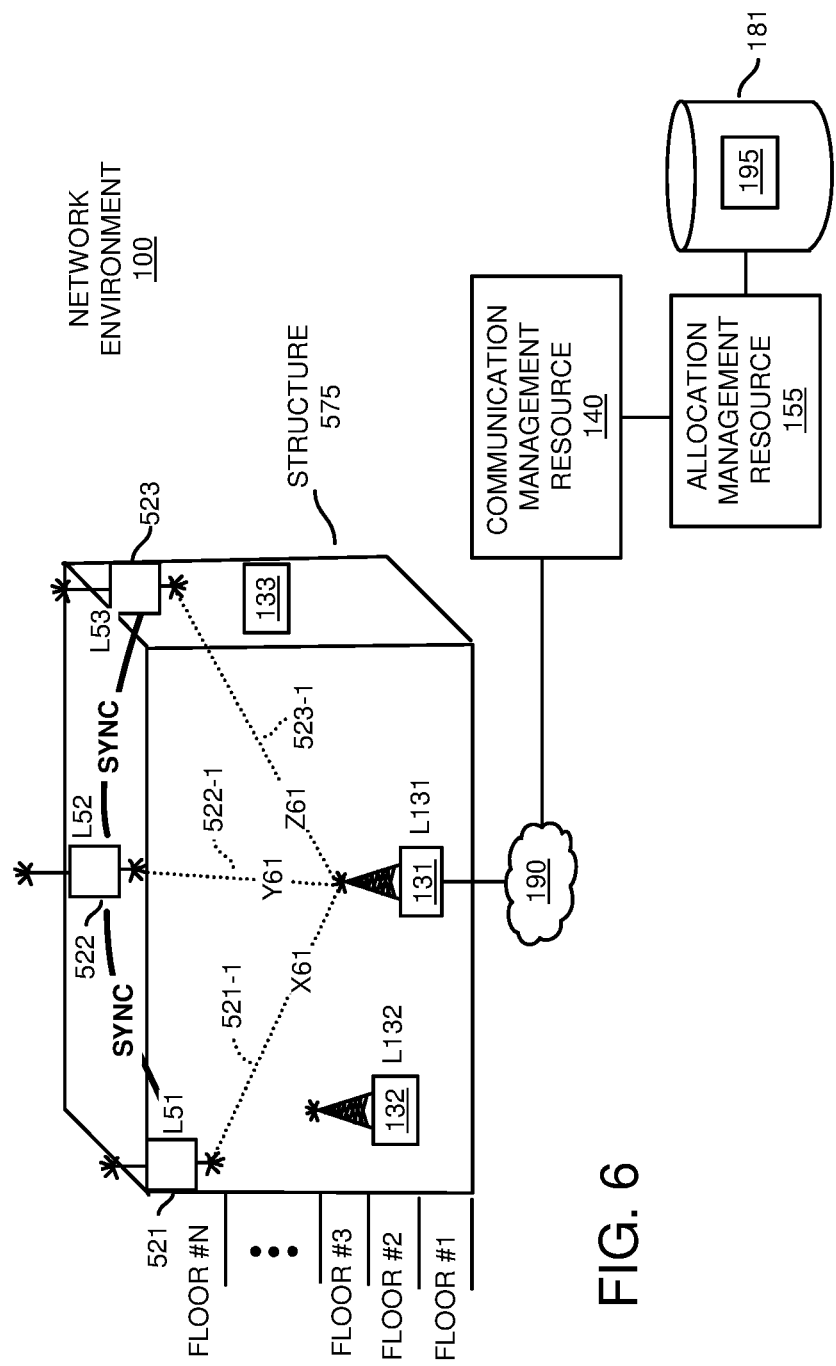
FIG. 6 is an example diagram illustrating determination of location of a wireless station in a building using input from multiple reference stations according to embodiments herein.

FIG. 6 is an example diagram illustrating determination of location of a wireless station in a building using input from multiple reference stations according to embodiments herein.

As previously discussed, the LTE (Long Term Evolution) wireless communication protocol has a Network Listening capability for synchronizing femtocells (small cell wireless base stations) with macrocells (large cell wireless base stations).

The wireless base station 131 can be configured to determine its location and synchronize itself to a network by communicating with one or more wireless reference station 521, wireless reference station 522, etc., having Macrocell network listen capability. The wireless reference stations can be equipped with an application that performs PTP (Precision Timing Protocol). In such an instance, the application in the wireless reference station retrieves and/or determines its location based on GPS signals such as in a manner as previously discussed. Location information can also be retrieved.

The wireless base station 131 such as a femtocell communicates with the macrocell wireless base station (such as wireless base station 132, wireless base station 133, wireless reference station 521, wireless reference station 522, etc.) and connects to the application. The femtocell wireless base station requests synchronization. The application in the macrocell initiates the PTP protocol. The PTP protocol synchronizes the femtocell with the Macrocell wireless base station and also determines the propagation delay from the macrocell to the femtocell. The application also provides a time window for the femtocell wireless base station to check back in for a time update. The time window may be based on the holdover time that the clock of the femtocell wireless base station is able to maintain. The holdover time of the femtocell wireless base station can be communicated from the femtocell wireless base station to the macrocell. In one embodiment, the reason for the time window is to spread out the requests to even out the load on the macrocell to support timing.

In accordance with further example embodiments, the PTP algorithm also allows the femtocell to know what the propagation delay is between the macrocell and the femtocell. The macrocell can provide its location coordinates, or the femtocell can retrieve them from a database. The femtocell now attempts to communicate with a second or possibly a third, fourth, etc., macrocell wireless base station (such as wireless reference station) in the network environment 100 and requests a PTP algorithm be run. With location coordinates from 3 or more macrocells, the femtocell (such as wireless base station 131) calculates its own location L131. This location is passed to a so-called spectrum access system when requesting allocation of one or more wireless channels. This location information can also be used to track the femtocell, or even geo-fence the femtocell.

Once the femtocell is synchronized, it can behave as the macrocell in assisting other devices in determining their location and becoming synchronized. In other words, as further discussed below, the femtocell now becomes a wireless reference station for other wireless base stations in the structure 575 trying to determine their locations.

A newly synchronized femtocell, or a functionally reduced femtocell acting as a wireless reference station can be mounted anywhere in the structure 575 to fill in timing and location holes. If operated in the CBRS band, the femtocell (such as wireless base station 131) needs a way to contact a SAS. It can do so by first acting as a UE and calling a serving application such as communication management resource 140. It reports its location from the GPS information it receives from the wireless reference stations 521, 522, 523, etc. In this way, the timing and location beacon does not need a permanent connection to the network.

Alternatively, if the femtocell does have a permanent connection to the network, it can use the same techniques as the femtocells to triangulate its location if it does not have GPS or is in a location where a GPS signal is not available.

This capability does not need to be a particular band. It could be in the CBRS band with CBRS service and compliant with SAS. It could also be in unlicensed bands. If implemented in lower frequency bands, coverage will be better provided that the femtocells also have radios in the same lower bands.

Now, more specifically, in this further example embodiment, the wireless base station 131 synchronizes itself with a master clock collectively associated with multiple reference stations 521, 522, 523, etc., in network environment 100.

The wireless base station 131 of unknown location receives wireless signals from the multiple reference stations 521, 522, 523, etc. Based on timing of the received wireless signals (such as based on time of flight information), and known locations of the wireless reference stations, the wireless base station 131 determines its current location L131 in the building (such as structure 575) with respect to the multiple reference stations 521, 522, 523, etc.

Further in this example embodiment, note that each wireless reference station broadcasts one or more wireless signals in vicinity of the structure 575 (such as one or more buildings) to any wireless stations in the structure 575 that would like to determine their respective location.

More specifically, in one embodiment as shown in FIG. 6, the wireless reference station 521 generates wireless signals 521-1; the wireless reference station 522 generates wireless signals 522-1; the wireless reference station 523 generates wireless signals 523-1; and so on.

In one embodiment, the wireless signals 521-1 indicate an identity of the wireless reference station 521 transmitting the wireless signals 521-1 as well as corresponding time information indicating when a respective wireless signal is transmitted from the wireless reference station 521 through the structure 575.

The wireless signals 522-1 indicate an identity of the wireless reference station 522 transmitting the wireless signals 522-1 as well as corresponding time information indicating when a respective wireless signal is transmitted from the wireless reference station 522 through the structure 575.

The wireless signals 523-1 indicate an identity of the wireless reference station 523 transmitting the wireless signals 523-1 as well as corresponding time information indicating when a respective wireless signal is transmitted from the wireless reference station 523 through the structure 575.

In accordance with further example embodiments, each of the wireless reference stations also forwards its corresponding determined location information to the wireless base station 131. For example, the wireless reference station 521 or other suitable entity forwards a location value of L51 (location of the wireless reference station 521) to the wireless base station 131; the wireless reference station 522 or other suitable entity forwards a location value of L52 (location of the wireless reference station 522) to the wireless base station 131; the wireless reference station 523 or other suitable entity forwards a location value of L53 (location of the wireless reference station 523) to the wireless base station 131; and so on.

In one embodiment, the wireless base station 131 uses the location of the wireless reference stations and time of flight information associated with received wireless signals 521-1, 522-1, 523-1, etc., as a basis to determine its own location.

For example, using trilateration, based on the times of flight X61, Y61, Z61, etc., associated with receiving wireless signals 521-1, 522-1, 523-1, etc., from requested wireless reference stations, the wireless base station 131 determines its own location L131 in the structure.

As a more specific example, in one embodiment, wireless base station 131 is synchronized with a master clock of the wireless reference stations 521, 522, 523, etc. Based on the timing (such as time of flight) associated with receiving wireless signal 521-1 with respect to a time that the wireless signal 521-1 is transmitted from the wireless reference station 521, the wireless base station 131 determines that it is a distance D1 from the wireless reference station 521 at location L51.

Based on the timing (such as time of flight) associated with receiving wireless signal 522-1 with respect to a time that the wireless signal 522-1 is transmitted from the wireless reference station 522, the wireless base station 131 determines that it is a distance D2 from the wireless reference station 522 at location L52.

Based on the timing (such as time of flight) associated with receiving wireless signal 523-1 with respect to a time that the wireless signal 523-1 is transmitted from the wireless reference station 523, the wireless base station 131 determines that it is a distance D3 from the wireless reference station 523 at location L53.

In one embodiment, using trilateration (such as intersection of respective distances D1, D2, D3, etc., with respect to the wireless reference stations transmitting the signals), the wireless base station 131 determines its location as being L131 (such as latitude, longitude, and altitude) with respect to the wireless reference stations.

Figure 7:
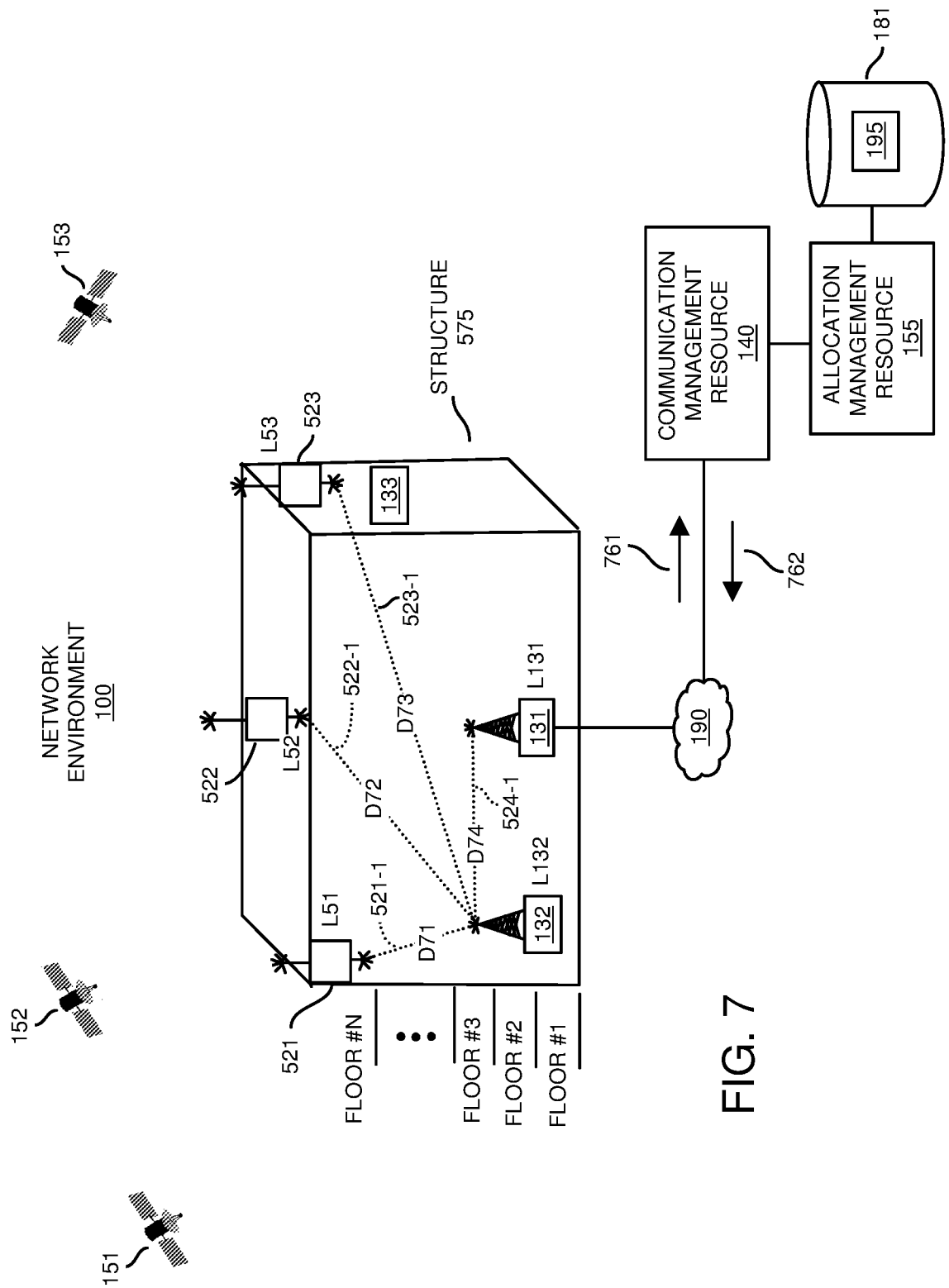
FIG. 7 is an example diagram illustrating allocation of one or more wireless channels to a wireless base station based on its determined location according to embodiments herein.

FIG. 7 is an example diagram illustrating allocation of one or more wireless channels to a wireless base station based on its determined location according to embodiments herein.

As further shown, after determining its location L131, the wireless base station 131 communicates over network 190 to the communication management resource 140 (such as a so-called domain proxy or other suitable entity) that handles communications on behalf of the allocation management resource 155 (such as a spectrum access system). The communication management resource 140 forwards registration information associated with wireless base station 131 and a request (such as channel request 761) for allocation of one or more wireless channels from the wireless base station 131 to the allocation management resource 155.

As its name suggests, via channel allocation information 195 in repository 181, the allocation management resource 155 keeps track of and controls allocation of one or more wireless channels to wireless stations (including wireless station 131, 132, 133, etc.) in the network environment 100 such that the two nearby wireless stations (such as residing on the same floor or same altitude in structure 575) are not allocated the same wireless channel.

Note that there may be sufficient isolation amongst the wireless base stations on different floors (such as one wireless base station on floor #1 and another wireless base station on floor #20) of the structure 575 such that two or more wireless base stations on different floors in the structure 575 can be allocated the same wireless channel for use.

Via the allocation management resource 155, one or more wireless channels are allocated based on knowing a location of the respective requesting wireless stations 131, 132, 133, etc., and spatially separating use of the same wireless channel prevents wireless interference amongst the wireless base stations.

Note further that subsequent to the wireless base station 131 learning its location L131 in the structure 575, the other wireless base stations such as wireless base station 132, wireless base station 133, etc., in the structure 175 can be configured to receive communications signals from wireless reference stations 521, 522, 523, etc., as well as wireless signals from wireless base station 131 to determine their location.

For example, in one embodiment, the wireless base station 132 is synchronized with wireless base station 131 as well as wireless reference stations 521, 522, 523, etc. Wireless base station 132 also receives location information indicating respective locations of the wireless base station 131 and locations of wireless reference stations 521, 522, 523, etc.

In a similar manner as previously discussed, the wireless base station 132 determines a respective time of flight associated with wireless communications from the wireless base station 131 and the wireless reference stations 521, 522, 523, etc. Via the time of flight information of signals 521-1, 522-1, 523-1, and 524-1 from respective wireless stations (wireless reference stations 521, 522, 523 and wireless base station 131) the wireless base station 132 determines distances of the wireless base station 132 to each of the wireless stations.

For example, via the time of flight of the wireless signal 521-1 from the wireless reference station 521 to the wireless base station 132, the wireless base station 132 determines that the wireless base station 132 is at a distance of D71 from the wireless reference station 521.

Via the time of flight of the wireless signal 522-1 from the wireless reference station 522 to the wireless base station 132, the wireless base station 132 determines that the wireless base station 131 is at a distance of D72 from the wireless reference station 522.

Via the time of flight of the wireless signal 523-1 from the wireless reference station 523 to the wireless base station 132, the wireless base station 132 determines that the wireless base station 132 is at a distance of D73 from the wireless reference station 523.

Via the time of flight of the wireless signal 524-1 from the wireless base station 131 to the wireless base station 132, the wireless base station 132 determines that the wireless base station 132 is at a distance of D74 from the wireless base station 131.

Based on trilateration, such as an intersection of the distances D71, D72, D73, D74 from the respective locations of transmitting wireless stations, the wireless base station 132 determines its location as L132. In such an instance, the wireless base station 132 (such as a femtocell, macrocell, etc.) supports location determination by other wireless base stations in the structure 575. For example, wireless base station 131 determines its location L131 based on locations of wireless reference stations 521, 522, 523, etc. Wireless base station 132 determines its location L132 based on locations of one or more wireless reference stations 521, 522, 523, etc., as well as a location of wireless base station 131 and corresponding wireless signals 524-1.

In a similar manner, each of the wireless stations in the structure 575 can be configured to utilize input from other wireless stations to determine their respective location.

Figure 8:
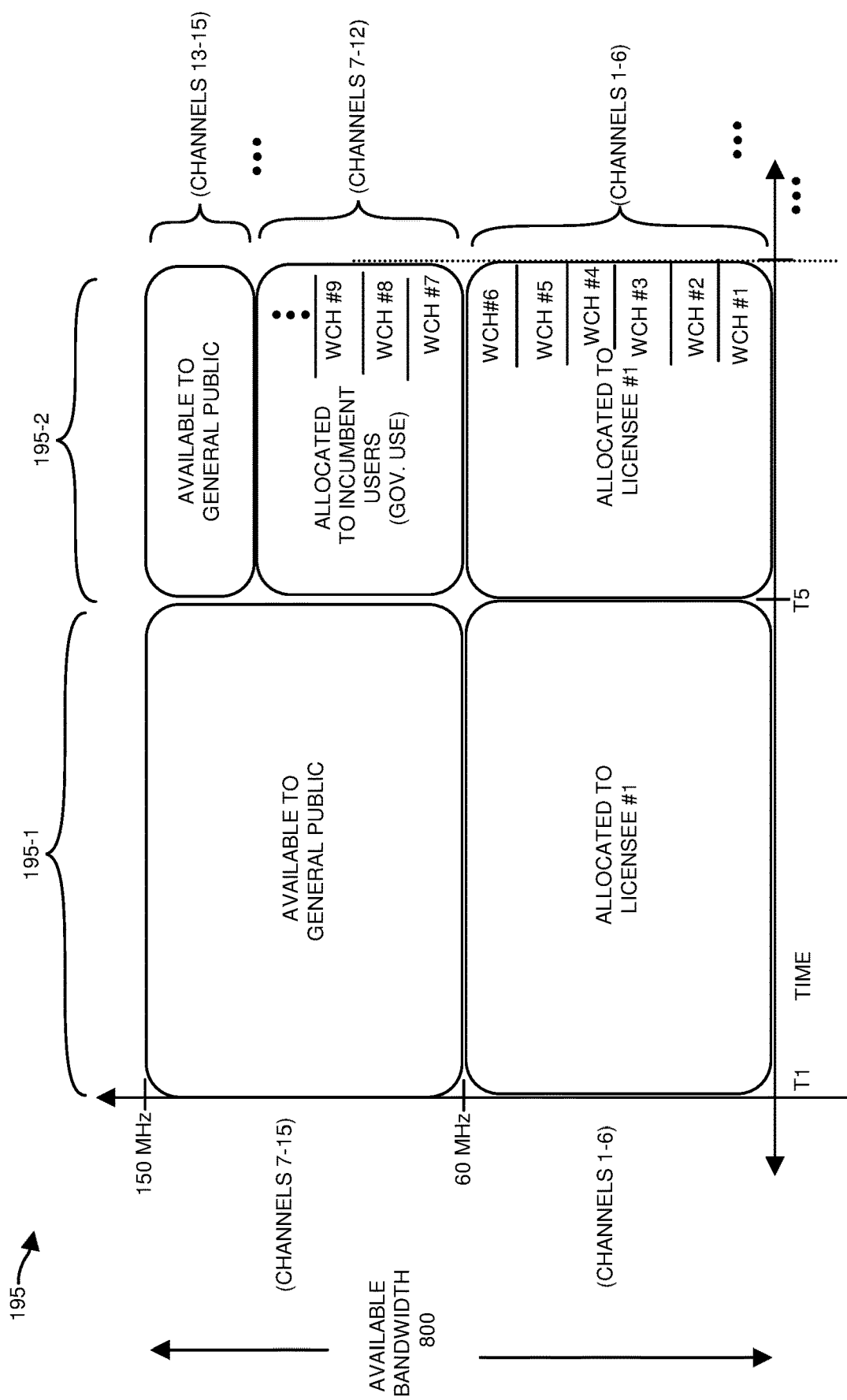
FIG. 8 is an example diagram illustrating allocation/deallocation of wireless channels from a tiered hierarchy according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, communication management resource 140 (such as spectrum access system, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 195-2.

More specifically, in this example, the allocation management information 195-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 195-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131.

In one embodiment, in response to revocation of the allocation of wireless channels 7-12, the communication management resource 140 notifies the wireless base station 131 at or around time T5 that the wireless base station 131 is no longer able to use wireless channel #7 because this channel has been revoked and assigned for use by the incumbent user.

Thus, between time T1 and time T5, assume that the allocation management resource 155 allocates wireless base station 131 use of the wireless channels #7 to provide wireless service to one or more corresponding communication devices. At or around time T5, the communication management resource 140 deallocates use of the wireless channel #7 from the wireless base station 131 in favor of use of the wireless channels #7 being used by or allocated to the incumbent user after time T5.

This illustrates the dynamic availability of different wireless channel bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

Figure 9:
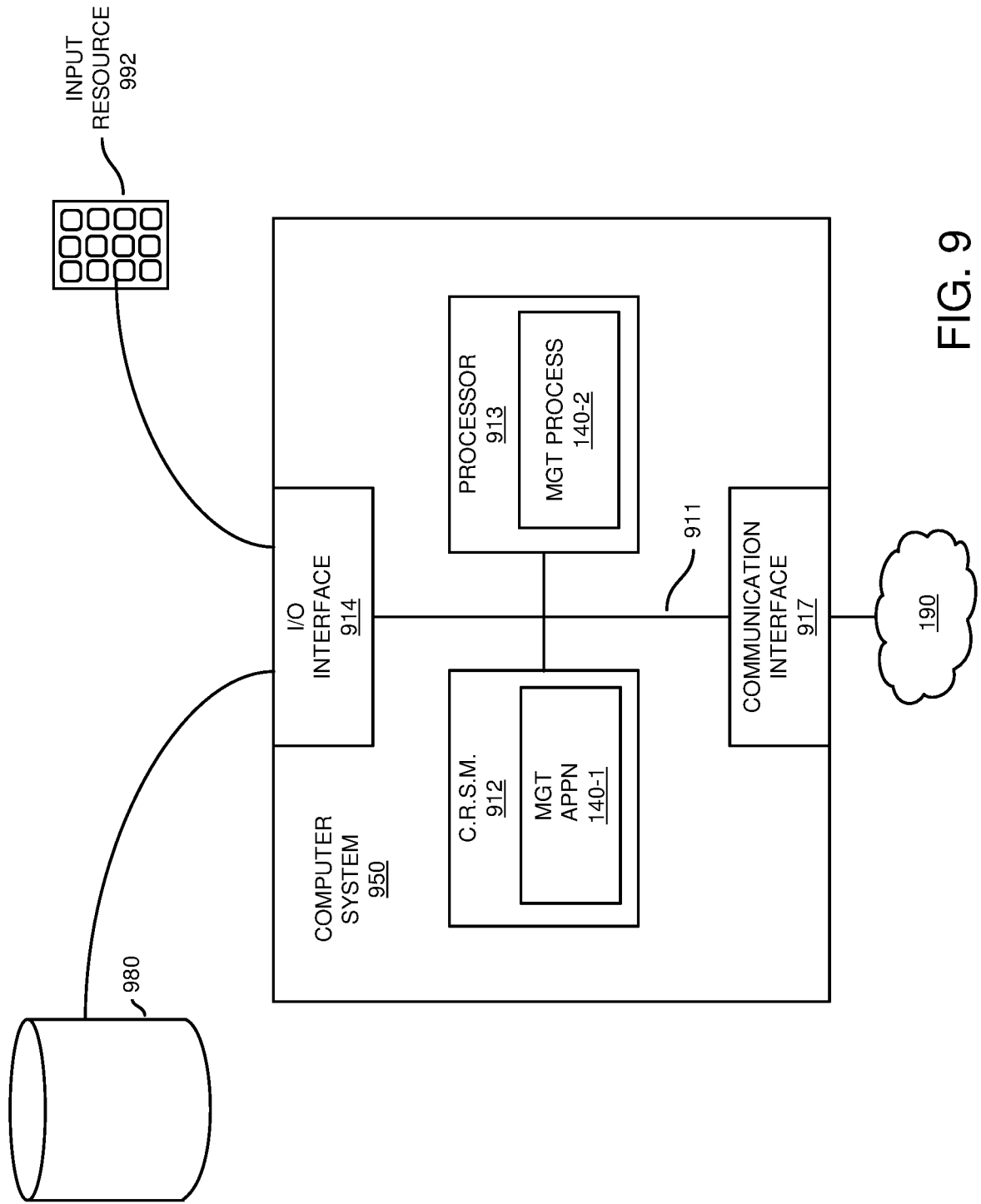
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless access points, wireless reference stations, wireless base stations, communication management resource, bandwidth management resource, allocation management resource, etc.) as discussed herein can be configured to include computer processor hardware and/or corresponding executable instructions to carry out the different operations as discussed herein.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIGS. 10 and 11. Note that the steps in the flowcharts below can be executed in any suitable order.

Figure 10:
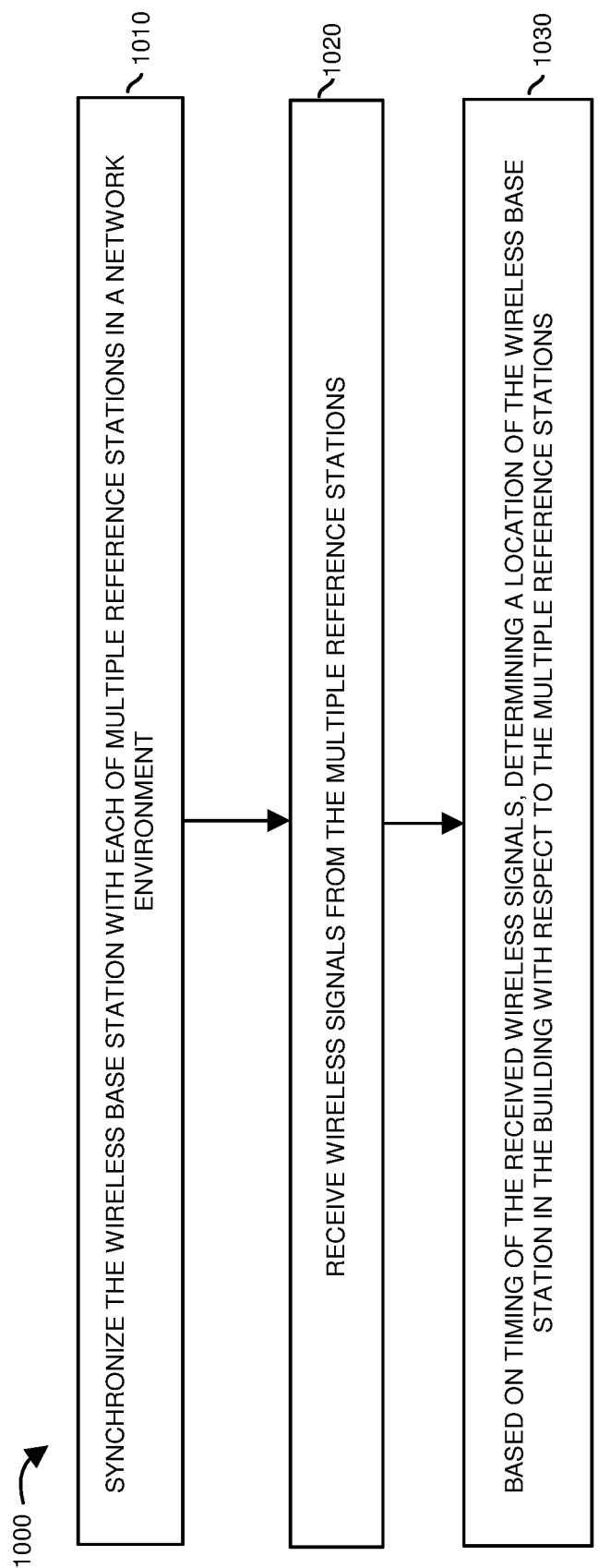
FIG. 10 is an example diagram illustrating a method according to embodiments herein.

FIG. 10 is a flowchart 1000 illustrating an example method according to embodiments. Note that flowchart 1000 overlaps/captures general concepts as discussed herein.

In processing operation 1010, the transponder 121 receives a first wireless satellite signal 151-1. The first wireless satellite signal 151-1 is received at a first wireless carrier frequency and supports location determination.

In processing operation 1020, the transponder 121 converts the first wireless satellite signal 151-1 into a first wireless transponder signal 121-1.

In processing operation 1030, the transponder 121 transmits the first wireless transponder signal 121-1 in the network environment 100 including wireless station 131. The first wireless transponder signal is transmitted at a second carrier frequency and supports location determination by the wireless station 131.

Figure 11:
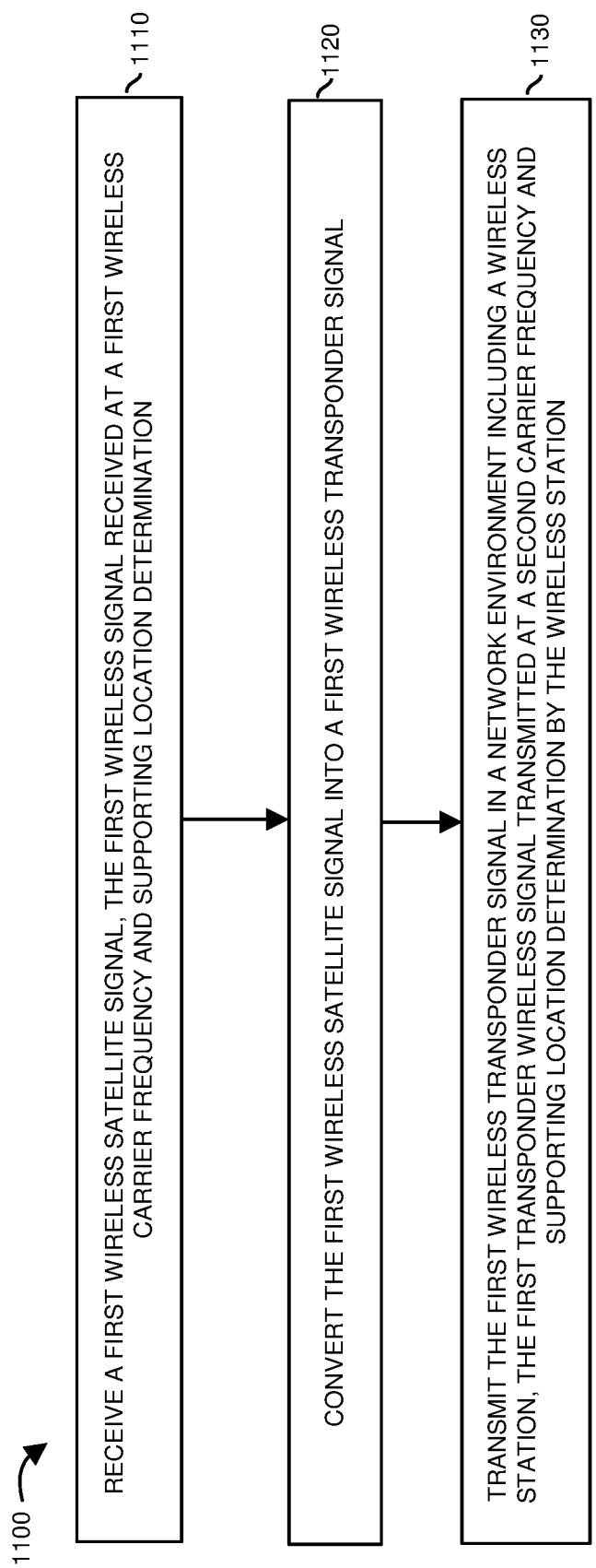
FIG. 11 is an example diagram illustrating a method according to embodiments herein.

FIG. 11 is a flowchart 1100 illustrating an example method according to embodiments. Note that flowchart 1100 overlaps/captures general concepts as discussed herein.

In processing operation 1110, the wireless base station 131 of unknown location is synchronized with each of multiple wireless reference stations 521, 522, and 523 in a network environment 100.

In processing operation 1120, the wireless base station 131 receives wireless signals (such as wireless signal 121-1) from the multiple wireless reference stations.

In processing operation 1130, based on timing of the received wireless signals, the wireless base station determines its location in the building (such as structure) with respect to the multiple wireless reference stations.

Note again that techniques herein are well suited to determine a location of a wireless station and subsequent allocation of wireless channels in a network environment.

However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
 via a first transponder:
  receiving a first wireless satellite signal, the first wireless satellite signal received at a first wireless carrier frequency and supporting location determination;
  converting the first wireless satellite signal into a first wireless transponder signal; and
  transmitting the first wireless transponder signal in a network environment including a wireless station, the first wireless transponder signal transmitted at a second carrier frequency and supporting location determination by the wireless station based on a first time of flight associated with the first wireless satellite signal and a second time of flight associated with the first wireless transponder signal.

2. The method as in claim 1, wherein the wireless station is disposed in a building that blocks the wireless station from receiving the first wireless satellite signal; and
 wherein converting the first wireless satellite signal into the first wireless transponder signal includes: via a first modulator, modulating the first wireless satellite signal using the second carrier frequency to produce the first wireless transponder signal.

3. The method as in claim 2, wherein the first wireless transponder signal is one of multiple sideband signals produced by the first modulator.

4. The method as in claim 1 further comprising:
 via a second wireless transponder:
  receiving a second wireless satellite signal, the second wireless satellite signal received at a third wireless carrier frequency and supporting the location determination;
  converting the second wireless satellite signal into a second wireless transponder signal; and
  transmitting the second wireless transponder signal in the network environment, the second wireless transponder signal transmitted at a fourth carrier frequency and supporting location determination by the wireless station.

5. The method as in claim 4, wherein converting the second wireless satellite signal into the second wireless transponder signal includes:
 via a second modulator, modulating the second wireless satellite signal by the second carrier frequency to produce the second wireless transponder signal.

6. The method as in claim 5, wherein the first wireless satellite signal is transmitted from a first GPS (Global Positioning System) satellite; and
 wherein the second wireless satellite signal is transmitted from a second GPS satellite.

7. The method as in claim 1 further comprising:
 via the first transponder:
  receiving a second wireless satellite signal, the second wireless satellite signal received at a third wireless carrier frequency and supporting the location determination;
  converting the second wireless satellite signal into a second wireless transponder signal; and
  transmitting the second wireless transponder signal in the network environment, the second wireless transponder signal transmitted at a fourth carrier frequency and supporting the location determination by the wireless station.

8. The method as in claim 1 further comprising:
 at the wireless station:
  receiving the first wireless transponder signal;
  deriving the first wireless satellite signal from the first wireless transponder signal; and
  utilizing the first wireless satellite signal derived from the first wireless transponder signal to determine a location of the wireless station in the network environment.

9. The method as in claim 8 further comprising:
 from the wireless station: communicating the determined location of the wireless station to a communication management resource that allocates use of wireless bandwidth to the wireless station based on the determined location.

10. The method as in claim 1 further comprising:
wirelessly transmitting a message in the network environment, the message indicating a location of the first transponder.

11. The method as in claim 1 further comprising:
receiving location information assigned to the wireless base station;
comparing the determined location of the wireless base station to the location information assigned to the wireless base station; and
based on results of the comparing, controlling assignment of a wireless channel to the wireless base station.

12. The method as in claim 1, wherein the first time of flight represents a first time delay between a satellite transmitting the first wireless satellite signal and the first transponder receiving the first wireless satellite signal.

13. The method as in claim 12, wherein the second time of flight represents a second time delay between the first transponder transmitting the first wireless transponder signal and the wireless station receiving the first wireless transponder signal.

14. The method as in claim 1, wherein the first wireless transponder signal supports determination of a total distance including: i) a first distance between a first satellite transmitting the first wireless satellite signal and the first transponder, and ii) a second distance between the first transponder and the wireless station.

15. The method as in claim 1, wherein the location determination includes determination of a location of the wireless station.

16. The method as in claim 1, wherein demodulation of the first wireless transponder signal via the second carrier frequency yields the first wireless satellite signal.

17. The method as in claim 1, wherein the first wireless transponder signal provides an indication of a broadcast time of a first satellite transmitting the first wireless satellite signal.

18. The method as in claim 1 further comprising:
via the first transponder, determining a location of the first transponder based on the first wireless satellite signal and a second wireless satellite signal received by the first transponder.

19. The method as in claim 1 further comprising:
receiving a delay value assigned to the first transponder; and
delaying transmission of transmitting the first transponder by a time duration as specified by the delay value.

20. The method as in claim 1 further comprising:
via the first transponder:
receiving a second wireless satellite signal, the second wireless satellite signal received at a third wireless carrier frequency and supporting the location determination;
converting the second wireless satellite signal into a second wireless transponder signal; and
transmitting the second wireless transponder signal in the network environment.

21. The method as in claim 1, wherein allocation of wireless channels to the wireless station is contingent upon detecting that the wireless station resides within a specified threshold value distance of a location of the first transponder.

22. The method as in claim 1, wherein the first transponder resides outside of a building and the wireless station resides in the building.

23. A system comprising:
a first transponder operative to:
receive a first wireless satellite signal, the first wireless satellite signal received at a first wireless carrier frequency and supporting location determination;
convert the first wireless satellite signal into a first wireless transponder signal; and
transmit the first wireless transponder signal in a network environment including a wireless station, the first wireless transponder signal transmitted at a second carrier frequency and supporting location determination by the wireless station based on time of flight associated with the first wireless transponder signal.

24. The system as in claim 23, wherein the first transponder includes a first modulator operative to:
modulate the first wireless satellite signal via the second carrier frequency to produce the first wireless transponder signal.

25. The system as in claim 24, wherein the first wireless transponder signal is one of multiple sideband signals produced by the first modulator.

26. The system as in claim 23 further comprising:
a second transponder operative to:
receive a second wireless satellite signal, the second wireless satellite signal received at a third wireless carrier frequency and supporting the location determination;
convert the second wireless satellite signal into a second wireless transponder signal; and
transmit the second wireless transponder signal in the network environment, the second wireless transponder signal transmitted at a fourth carrier frequency and supporting the location determination by the wireless station.

27. The system as in claim 26, wherein the second transponder includes a second modulator operative to:
modulate the second wireless satellite signal via the second carrier frequency to produce the second wireless transponder signal.

28. The system as in claim 27, wherein the first wireless satellite signal is transmitted from a first GPS satellite; and wherein the second wireless satellite signal is transmitted from a second GPS satellite.

29. The system as in claim 23, wherein the first transponder is further operative to:
receive a second wireless satellite signal, the second wireless signal received at a third wireless carrier frequency and supporting the location determination;
convert the second wireless satellite signal into a second wireless transponder signal; and
transmit the second wireless transponder signal in the network environment, the second wireless transponder signal transmitted at a fourth carrier frequency and supporting the location determination by the wireless station.

30. The system as in claim 23, wherein the wireless station is operative to:
receive the first wireless transponder signal;
derive the first wireless satellite signal from the first wireless transponder signal; and
utilize the first wireless satellite signal derived from the first wireless transponder signal to determine a location of the wireless station in the network environment.

31. The system as in claim 30, wherein the wireless station is operative to:

communicate the determined location of the wireless station to a communication management resource that allocates use of wireless bandwidth to the wireless station based on the determined location.

32. Computer-readable storage hardware having instructions stored thereon, the instructions, when carried out by computer processor hardware, cause the computer processor hardware to:
receive a first wireless satellite signal, the first wireless satellite signal received at a first wireless carrier frequency and supporting location determination;
convert the first wireless satellite signal into a first wireless transponder signal; and
transmit the first wireless transponder signal in a network environment including a wireless station, the first wireless transponder signal transmitted at a second carrier frequency and supporting location determination by the wireless station based on conversion of the first wireless transponder signal back to the first wireless satellite signal modulated at the first wireless carrier frequency.

33. A method comprising:
at a wireless base station disposed in a building:
synchronizing the wireless base station with a master clock that provides synchronization of multiple reference stations in a network environment;
receiving wireless signals from the multiple reference stations; and
based on timing of receiving the wireless signals from the multiple reference stations, determining a location of the wireless base station in the building with respect to the multiple reference stations.

34. The method as in claim 33, wherein receiving the wireless signals from the multiple reference stations includes:
receiving a first wireless signal, the first wireless signal received from a first reference station at a first location;
receiving a second wireless signal, the second wireless signal received from a second reference station disposed at a second location; and
receiving a third wireless signal, the first wireless signal received from a third reference station disposed at a third location.

35. The method as in claim 34 further comprising:
receiving location information indicating locations of the multiple reference stations; and
determining the location of the wireless base station based on the timing of the received wireless signals and the locations of the multiple reference stations.

36. The method as in claim 35, wherein the location information is derived at least in part from the multiple reference stations detecting their location based on wireless signals received from satellites.

37. The method as in claim 33, wherein determining the location of the wireless base station in the building includes:
determining a height of the wireless base station in the building with respect to the multiple reference stations.

38. The method as in claim 33, wherein the wireless base station is a first wireless base station, the method further comprising:
subsequent to determining the location of the wireless base station, transmitting a location signal from the first wireless base station, the location signal supporting determination of a respective location of a second wireless base station in the network environment.

* * * * *

UNITED STATES PATENT AND TRADEMARK OFFICE
CERTIFICATE OF CORRECTION

| | | |
|---|---|---|
| PATENT NO. | : 11,792,763 B2 | Page 1 of 1 |
| APPLICATION NO. | : 17/026559 | |
| DATED | : October 17, 2023 | |
| INVENTOR(S) | : Charles I. Cook | |

It is certified that error appears in the above-identified patent and that said Letters Patent is hereby corrected as shown below:

In the Claims

Claim 11, Line 4, replace "the" with --a--
Claim 11, Line 6, delete "base"
Claim 19, Line 4, replace "transmitting the" with --transmitting from the--

Signed and Sealed this
Nineteenth Day of December, 2023

Katherine Kelly Vidal
*Director of the United States Patent and Trademark Office*